Sept. 11, 1956 Y. M. PONSAR 2,762,202
SIPHONS FOR THE REGULATION OF THE UPSTREAM LEVEL OF A LIQUID
Filed April 13, 1953 2 Sheets-Sheet 1

Inventor
Yves M. Ponsar
By
Young, Emery & Thompson
Attys.

Inventor
Yves M. Ponsar

United States Patent Office 2,762,202
Patented Sept. 11, 1956

2,762,202

SIPHONS FOR THE REGULATION OF THE UPSTREAM LEVEL OF A LIQUID

Yves Marie Ponsar, Bois-Colombes, France

Application April 13, 1953, Serial No. 348,536

Claims priority, application France April 17, 1952

4 Claims. (Cl. 61—18)

This invention relates to means for regulating the upstream level of a liquid in a reservoir, basin, canal or like body of water provided with means for allowing the liquid to overflow to a lower level under certain conditions.

In order to prevent the level of liquid in a reservoir, basin, canal or like body of water from exceeding a certain datum mark, a method usually employed consists in immersing the ascending branch of a siphon in the said water, the siphon discharging downstream at such a rate of flow that the upstream level remains sensibly constant when the said siphon is in operation.

To this end, the upper portion of the siphon is connected to a pipe extending up to the body of water of which it is desired to regulate the level, the opening of the pipe being placed at the datum mark to which the level is to be maintained. The siphon being started, the air abstracted from the space at the upper portion of the siphon and being carried along in the form of bubbles downstream through the descending branch of the siphon is so to speak restituted by the said pipe. When the level happens to rise above the regulation datum mark, less air passes through the pipe, the fall of pressure in the siphon increases, the rate of liquid flow increases and the upstream level tends in this manner to fall to return to the required datum mark. Inversely, when the upstream level happens to fall below the regulation mark, the opening of the pipe emerges to a great extent, a large quantity of air passes through the pipe into the siphon, the fall of pressure in the siphon decreases, the rate of liquid flow decreases and the upstream level tends in this manner to rise to again return to the regulation mark.

However, such a regulation is only stable in the range in which the rate of flow of the liquid passing through the siphon is greater than a minimum value below which the regime of the siphon is unstable and it ceases to function.

Experience shows that this minimum value is approximately equal to one third of the maximum rate of flow which can take place through the siphon.

It will be conceived that this lack of stability over such an extensive lower range of rates of flow constitutes a serious inconvenience.

In order to reduce the range of unstable rates of flow, it has already been proposed to apply the opening of the pipe not directly to the upstream level to be regulated but to an auxiliary level under the control on the one hand of the upstream level and on the other hand of a factor which depends on the rate of liquid flow through the siphon.

In the known apparatus, this auxiliary level is controlled with respect to the level to be regulated by the depression which exists in the air space of the siphon. It will be then understood that when the rate of flow is small, only a little air is carried downstream, the depression in the air space of the siphon is reduced, the auxiliary level moves perfectly freely with respect to the upstream level to be regulated, in order to stop the air supply to the siphon, which avoids any unpriming of the latter. The stability is in this manner considerably extended towards the small rates of flow.

However, these known apparatus suffer from certain drawbacks, such as a complicated construction and uncertain operation.

The present invention has for its object a siphon for the regulation of the upstream level of a flowing liquid of the type comprising an auxiliary level for the stability at small rates of flow, the said siphon being simple and easy to construct and its working being certain and effectual.

According to the invention, the siphon comprises an opening in the wall of its ascending branch which is adjacent to the level to be regulated, so that the ascending flow of liquid in the said branch determines opposite the upper edge of the said opening an auxiliary reference liquid level lower than the upstream level by a distance which is a function of the speed of the said flow; it is by this opening that the air, in the form of bubbles, feeds the upper air space of the siphon. With a particularly simple construction of the siphon, a very simple means for regulating the upstream level is obtained, even with very small rates of flow. It is to be noticed that the auxiliary level closes the opening at small rates of flow, falls to uncover the opening with medium rates of flow and closes again the opening with high rates of flow; as to the upstream level, it rises constantly with the rate of flow owning to the arrangement according to the invention, which ensures the stability of the regulation even with small rates of flow.

In a particular embodiment, the opening is provided lower than the sill of the siphon and it is necessary to prime the siphon by any suitable means, after which the siphon remains primed and ensures the regulation of the upstream level, while in alternative arrangements, the upper edge of the opening is provided slightly higher than the sill of the siphon, so that the siphon can automatically prime itself and afterwards ensure normally the regulation of the upstream level.

According to another characteristic feature, the ascending branch of the siphon is so shaped as to converge towards the opening, so that the section of the branch aforesaid at the level of the opening is reduced, the speed of the flow at the level of the opening being in this manner increased, which enhances the distance separating the auxiliary level from the upstream level and increases the range of the stable rates of flow.

In the embodiments of the invention, various devices are added at the opening in order to enhance the distance between the auxiliary level and the upstream level so as to increase the range of stable rates of flow, and means may be provided besides in order to enhance the functioning of the siphon at high rates of flow.

In a preferred embodiment, a casing having the shape of a stoup and open at its upper portion is mounted opposite the opening on the wall of the ascending branch, while a lid is provided above the said casing. Owing to this arrangement, the functioning of the siphon is particularly stable and effectual not only with medium rates of flow but also with small and large rates of flow, the regulated upstream level preserving its regulation datum mark between close limits.

The characteristic features and the advantages of the invention will besides become apparent from the description which will follow of embodiments selected in way of examples with reference to the appended drawings, in which.

Figure 3:
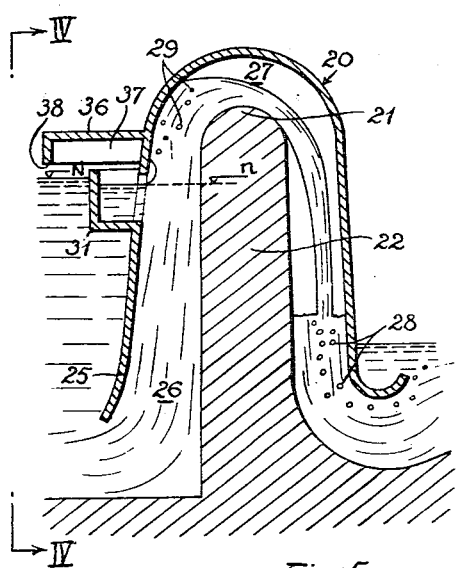
Fig. 3 is a view similar to that of Fig. 2 of an alternative embodiment.

3 seen in the direction of the arrows IV—IV of this Fig. 3.

Figure 2:
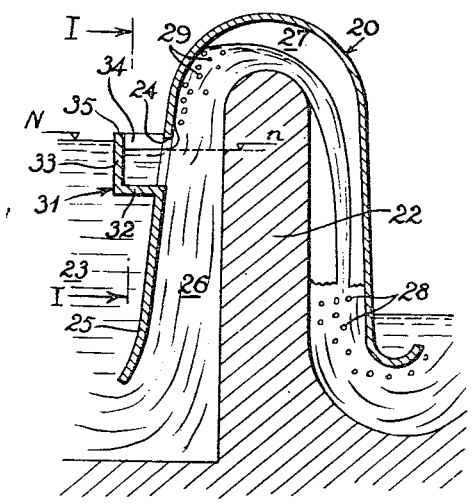
Fig. 2 is a section of this siphon.
Figure 5:
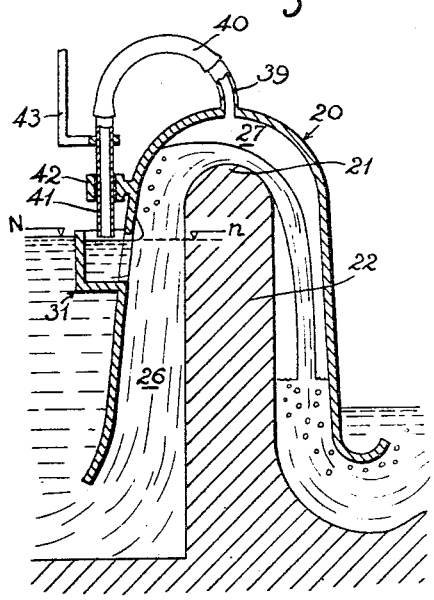
Figure 6:
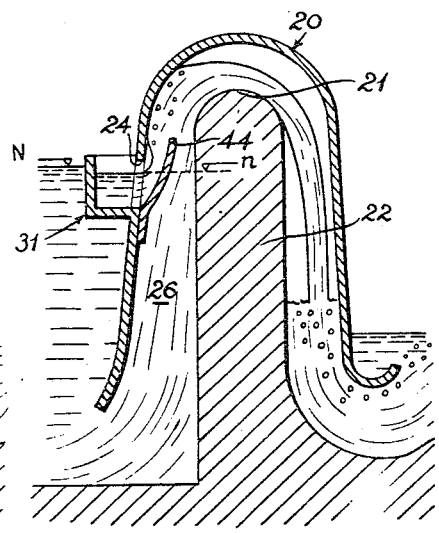

Figs. 5 and 6 are views similar to that of Fig. 2 of two other embodiments.

Figure 1:
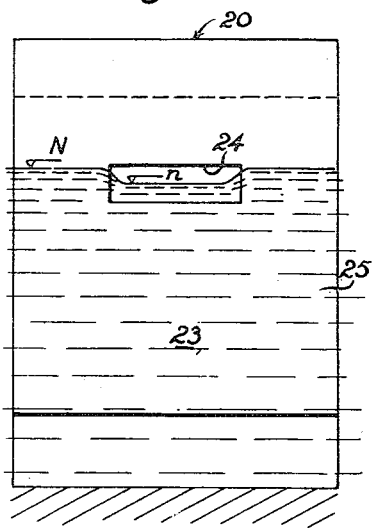
Fig. 1 is a front elevation of a siphon according to the invention as seen in the direction of the arrows I—I of Fig. 2.

Referring first to the Figs. 1 and 2, in which is seen at 20 a siphon the internal sill of which, 21, is rounded and formed at the upper edge of a wall 22: at 23 is seen a body of water disposed upstream of the siphon 20 and the level N of which is intended to be regulated by the siphon.

An opening 24 is provided in the wall 25 of the siphon which is adjacent to the space 27 and which defines with the wall 22 the ascending branch 26 of the siphon. The opening 24, provided practically level with the datum mark of the level N to be regulated, is lengthened horizontally (Fig. 1) in the shape of a horizontal slit, while the branch 26 is converging upwardly towards the opening 24, the section of the branch 26 normally to the opening being thereby reduced.

When functioning, when the siphon is primed, water rises in the branch 26 and is poured over the sill 21 to be discharged downstream. The upper air space 27 of the siphon becomes deficient in air owing to the fact that bubbles 28 are carried along downstream by the water, but the space 27 is supplied with air by air bubbles 29 which come from that portion of the opening 24 which is uncovered by the water.

The level $n$ of the water normally to the opening 24 is lower than the level N by a distance which is a function of the speed of the water in the ascending branch 26. Now, this speed is increased in proportion to the narrowing of the branch 26 opposite the opening, so that the level $n$ is off-set with respect to the level N of an amount which varies very approximately as a function of the rate of flow of the liquid passing through the siphon.

It is the level $n$, acting as an auxiliary level, which is directly regulated by the siphon by the stream of air bubbles 29 introduced and of the air bubbles 28 discharged, and as the level $n$ closely depends on the level N, it is seen that the level N is in effect regulated to the required datum mark. This is, besides, conclusively demonstrated by trials.

Due to such an arrangement, the level N rises constantly with the rate of flow due to distance between levels N and $n$ which is an ascending function of the rate of flow, and such a constant rising is favorable to the stability of small rates of flow, which small rates are generally considered as not being adapted for a stable regulation.

So, with a particularly simple and economical construction, a very extended range of rates of flow is obtained towards the small rates of flow where the regulation of the level N is stable.

It will be appreciated that the horizontal lengthening of the opening 24 in the form of a slit enhances the precision and the stability of the regulation.

In the embodiment shown in Fig. 2, a casing 31 in the shape of a stoup and open at its upper portion is mounted in the water space on the wall 25. The bottom 32 of the casing 31 is sensibly horizontal and extends adjacently under the opening 24, while the front 33 and the sides 34 of the casing 31 extend upwards from the bottom 32 and have upper horizontal edges 35 situated at a higher level than the upper edge of the opening 24. Such an arrangement enhances the stability at small rates of flow.

The level N is normally situated under the upper edge of the casing 31 and so it is seen that the level $n$ is isolated from the level N. This, however, does not change the functioning with respect to that which has been described.

However, when the level N rises in an untimely manner above the edge 35, this rise of level causes water to pour into the casing 31 and tends to close in a much more effective manner the opening 24 than if there were no pouring over. As soon as the level N rises above the edge 35, the siphon immediately discharges on full regime, which causes the level N to fall rapidly and maintains it between the regulation limits.

Figure 4:
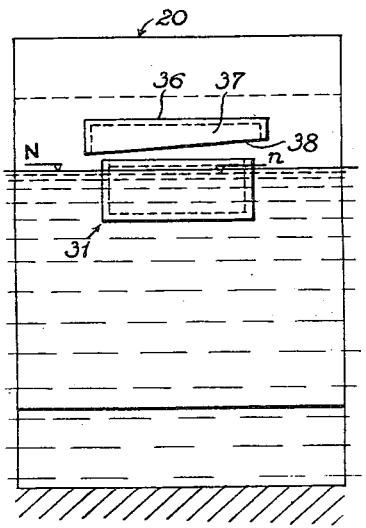
Fig. 4 is a front elevation of the siphon shown in Fig.

Referring now to the Figs. 3 and 4, in which the arrangement is similar to that of Fig. 2 with a stoup, but in which there is provided besides a lid 36 at a certain distance above the stoup. This lid has an edge 37 extending downwards and the lower edge of which 38 is slightly inclined to the horizontal and is situated slightly above the edge 35, round and externally to the latter.

In the case of an untimely rise of the level N, this arrangement permits to immediately prevent any passage of air and to bring about the full regime of the siphon to cause the level N to rapidly fall to the desired value.

In the alternative embodiment shown in Fig. 5, in which a stoup 31 is provided as in Fig. 2, a pipe 39 connected to the air space 27 of the siphon, comprising an intermediate flexible portion 40, dips below the level $n$ by a vertical rigid portion 41 open at the end. The opening 24 is intended for the passage of water in the stoup and the pipe 39 is intended for the passage of the air.

The rigid portion 41 is slidably vertically mounted in a fixed guide 42 and is connected to operative means 43 adapted to regulate at will the level of the lower opening of the portion 41.

In the alternative embodiment shown in Fig. 6 in which a stoup 31 is provided as in Fig. 2, a deflecting plate 44 extends upwardly in the branch 26 from the lower edge of the opening 34 and enhances the stability at small rates of flow.

It is well understood that the invention is not limited to the embodiments described and represented but includes all alternatives in the carrying into effect of its various constituent parts.

What I claim is:

1. In combination with a dam, a siphon for the regulation of the level of a liquid upstream of the dam, said siphon comprising an ascending branch having an opening in the wall thereof through which opening atmospheric air is aspirated in the said ascending branch, the lower edge of the opening being located below the top of the dam and in the vicinity of a datum mark at which it is desired that the level aforesaid be maintained while the same wall is extended downwardly below said datum mark, thereby maintaining the level aforesaid constant, a box-like open top enclosure on the wall of the ascending branch enclosing said opening, said enclosure having a bottom, and walls extending upwardly from the bottom to a level above the upper edge of the opening in the ascending branch of the siphon, said siphon having a top portion extending over the dam and a descending portion on the downstream side of the dam.

2. A siphon according to claim 1 further comprising a cover carried by the ascending branch and projecting horizontally over the open top enclosure in spaced relation to the same.

3. A siphon as claimed in claim 1, in combination with a pipe, the lower end of which opens in the said enclosure and the upper end of which opens in the top portion of the said siphon.

4. A siphon as claimed in claim 3, further comprising means for adjusting at will the height of the opening of the lower end of the said pipe above the bottom of the enclosure.

References Cited in the file of this patent

UNITED STATES PATENTS

| 1,757,872 | Mitchell | May 6, 1930 |
| 2,022,927 | Simpson | Dec. 3, 1935 |

FOREIGN PATENTS

| 41,545 | Germany | 1887 |
| 468,188 | Italy | Dec. 29, 1951 |
| 558,143 | France | May 17, 1923 |
| 752,834 | France | July 24, 1933 |